(12) United States Patent
Smith et al.

(10) Patent No.: US 7,519,682 B2
(45) Date of Patent: Apr. 14, 2009

(54) WIRELESS PROGRAMMABLE USER INTERACTION SYSTEM WITH MACHINE-READABLE TAGS FOR PHYSICAL OBJECTS

(75) Inventors: Marc A. Smith, Redmond, WA (US); Duncan L. Davenport, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 788 days.

(21) Appl. No.: 10/608,240

(22) Filed: Jun. 27, 2003

(65) Prior Publication Data
US 2004/0267879 A1 Dec. 30, 2004

(51) Int. Cl.
*G06F 15/16* (2006.01)
*G06K 7/10* (2006.01)

(52) U.S. Cl. ........................ 709/218; 709/201; 709/202; 709/203; 709/207; 709/217; 709/219; 235/472.01

(58) Field of Classification Search ................. 709/207, 709/218, 219, 201–203, 217; 235/472.01
See application file for complete search history.

(56) References Cited

U.S. PATENT DOCUMENTS

| | | | | | |
|---|---|---|---|---|---|
| 5,902,353 | A | * | 5/1999 | Reber et al. ................. | 709/219 |
| 5,903,729 | A | * | 5/1999 | Reber et al. ................. | 709/219 |
| 5,938,726 | A | * | 8/1999 | Reber et al. ................. | 709/217 |
| 5,940,595 | A | * | 8/1999 | Reber et al. ................. | 709/227 |
| 5,991,759 | A | * | 11/1999 | Knoblock et al. ............. | 707/10 |
| 5,992,752 | A | * | 11/1999 | Wilz et al. ............. | 235/472.01 |
| 5,995,105 | A | * | 11/1999 | Reber et al. ................. | 715/835 |
| 6,119,944 | A | * | 9/2000 | Mulla et al. ............ | 235/472.03 |
| 6,134,548 | A | * | 10/2000 | Gottsman et al. .............. | 707/5 |
| 6,199,099 | B1 | * | 3/2001 | Gershman et al. ........... | 709/203 |
| 6,338,082 | B1 | * | 1/2002 | Schneider ................... | 709/203 |
| 6,356,905 | B1 | * | 3/2002 | Gershman et al. ............. | 707/10 |
| 6,356,949 | B1 | * | 3/2002 | Katsandres et al. ......... | 709/238 |
| 6,370,521 | B1 | * | 4/2002 | Pigos et al. .................... | 707/2 |
| 6,442,549 | B1 | * | 8/2002 | Schneider ................... | 707/10 |
| 7,089,199 | B2 | * | 8/2006 | Perkowski ................... | 705/27 |
| 2003/0014269 | A1 | * | 1/2003 | Malkin et al. .................. | 705/1 |
| 2006/0118631 | A1 | * | 6/2006 | Lubow et al. .......... | 235/462.01 |

* cited by examiner

*Primary Examiner*—Kenny S Lin
*Assistant Examiner*—Hieu T Hoang
(74) *Attorney, Agent, or Firm*—Lyon & Harr, LLP; Katrina A. Lyon

(57) ABSTRACT

A wireless programmable user interaction system allows a user to interact with networked services relating to physical objects that have associated machine-readable tags. The system includes a portable interaction device in wireless communication with a local computer network. The portable interaction device includes a portable computing device, such as a hand-held computer, and an associated machine-readable tag reader (e.g., a bar code reader). An interaction system catalog in the portable computing device stores tag format information that correlates the tag identity information with an identity information category and related information. The interaction system catalog can indicate the types of information, interactions, or other computer network services that are available and relevant to the physical object. Upon selection of a desired network service by a user, a functional payload is delivered to the portable computing device over the wireless network connection to be executed. The functional payload may originate from the local network with which the wireless communication takes place or from any payload server located anywhere on the public global computer network.

24 Claims, 2 Drawing Sheets

WIRELESS PROGRAMMABLE USER INTERACTION SYSTEM WITH MACHINE-READABLE TAGS FOR PHYSICAL OBJECTS

TECHNICAL FIELD

The present invention relates to associating information from computer networks with physical objects and, in particular, to a system in which machine-readable tags associated with physical objects allow a user with a wireless programmable device to access information, interactions, and other services from a computer network.

BACKGROUND AND SUMMARY

There is currently a stark contrast between the large amount of information and other services that are available over computer networks and the relatively small amount of information that is provided directly with most physical things. Physical objects such as products in stores, art in galleries, directional signs, buildings, etc., typically have only a limited amount of information directly associated with them. A few printed words on a product package, an adjacent wall, a placard, etc., typically provide a person with only a small fraction of the information that is readily available about the object on the public global computer network (i.e., the Internet).

Limitations in the amount of information provided directly on or with physical objects reflect the spatial and aesthetic constraints of fixed printed text. In addition, large amounts of such information are not desired by everyone and can be counter-productive, because some people might entirely avoid dense amounts of such detailed information.

This contrast between the amounts of such information gives rise to an informational dichotomy. Physical objects, which include the rich perceptual information about texture, sight, context, etc., typically have directly with them only a small fraction of the relevant information that is available over computer networks. One the other hand, the rich information, interactions, and other associations that are available over computer networks for a wide range of topics are usually accessible only apart from the physical objects that are the subject of the information.

The present invention provides links between physical objects and the rich information, interactions, and other services that are available over computer networks. A wireless programmable user interaction system allows a user to interact with networked services relating to physical objects that have associated machine-readable tags. The machine-readable tags may be of virtually any format, including bar codes and radio frequency identifiers (RFIDs), for example.

In one implementation, the system includes a portable interaction device in wireless communication with a local computer network. The portable interaction device includes a portable computing device such as a hand-held computer, a tablet computer, a cellular telephone, etc., and an associated machine-readable tag reader (e.g., a bar code reader). With such a portable interaction device, a user may scan the tag of a physical object (e.g., a book in a shop, a product in a grocery store, art in a gallery, etc.) and generate tag identity information relating to the physical object.

An interaction system catalog in the portable computing device stores tag format information that correlates the tag identity information with an identity information category and related information. As a result, the interaction system catalog can indicate the types of information, interactions, or other computer network services that are available and relevant to the physical object. Upon selection of a desired network service by a user, a functional payload is delivered to the portable computing device over the wireless network connection to be executed or rendered (collectively, executed). The functional payload may be executed directly by the portable computing device or, as in one implementation, by a browser running on the portable computing device. The functional payload may originate from the local network with which the wireless communication takes place or from any payload server located anywhere on the public global computer network.

The full variety of network services can be provided in association with a physical object, including additional information sources, computer network search results, user-posting sites where a user can post comments or annotations or otherwise interact with other users, commercial sites where related products may be ordered, etc.

The wireless programmable user interaction system according to the present invention provides a platform for coupling physical objects with the rich variety of services available over computer networks. A portable computing device and a tag reader in wireless communication with a computer network can provide a user with access to network services relating to specific physical objects. Payloads delivered over the wireless network connection provide a versatile system that can accommodate large numbers and varied types of physical objects.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
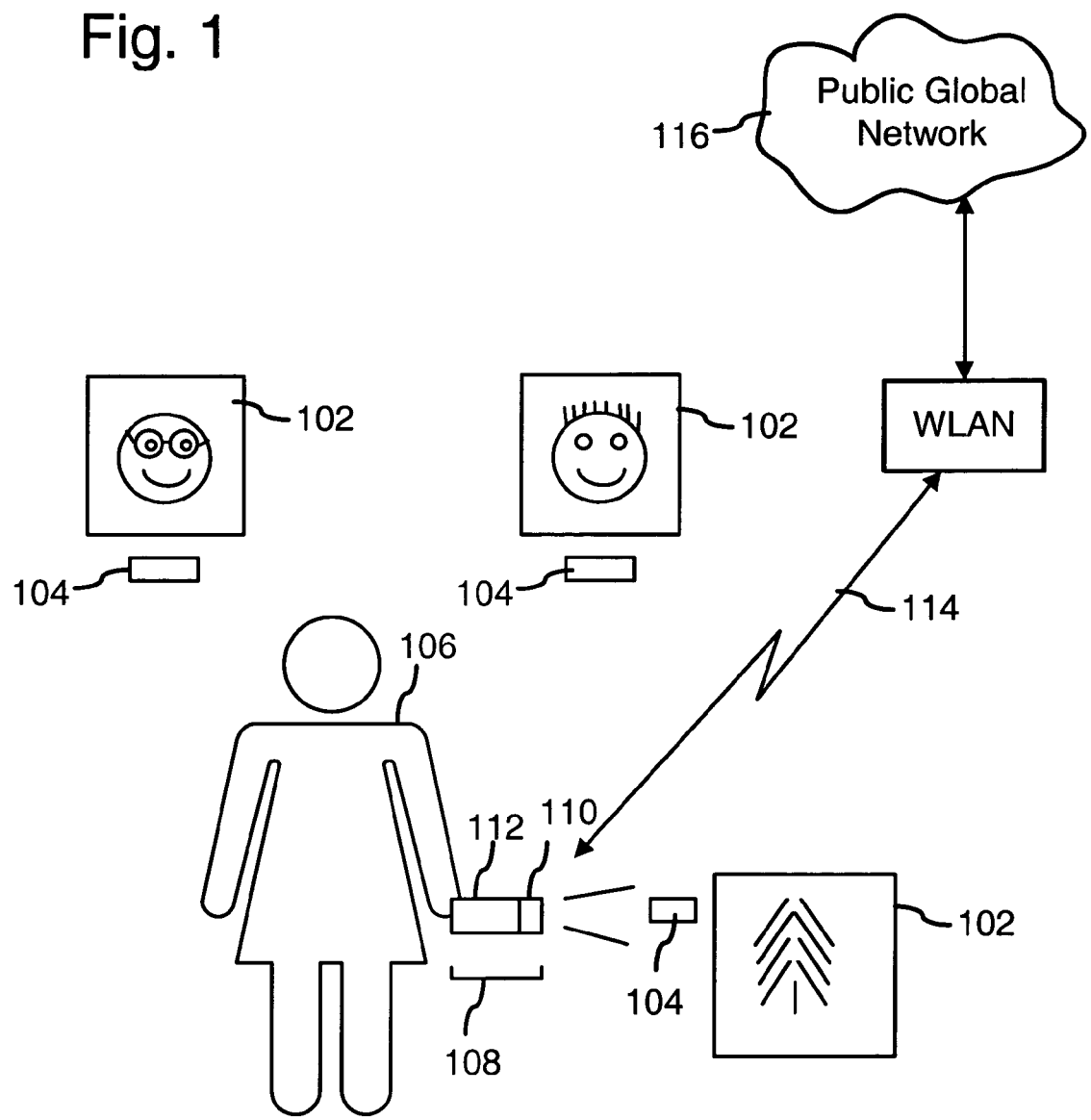
FIG. 1 is a diagrammatic illustration of an operating environment for one implementation of a wireless programmable user interaction system.

FIG. 1 is a diagrammatic illustration of an operating environment for one implementation of a wireless programmable user interaction system 100 (FIG. 2) to provide user interaction with networked services (e.g., information, interaction, functions or operations) relating to physical objects 102 that have associated machine-readable tags 104. As an exemplary implementation, physical objects 102 may be any of a variety of physical objects, including works of art, books, merchandise, physical places, etc., with each of which a unique machine-readable tag 104 is associated (e.g., attached to or adjacent). Machine-readable tags 104 may employ or be implemented in accordance with any of a variety of well-known technologies, including bar codes and Radio Frequency Identification (RFID) tags.

Wireless programmable user interaction system 100 allows a user to interact with information, functions or operations relating to each physical object 102 that has a machine-readable tag 104. For example, a user may annotate and save to a computer network any information, thoughts, or comments the user might want to correlate with the physical object 102. The annotations may be stored on the computer network with annotated information from other users, for example.

Wireless programmable user interaction system 100 includes for a user 106 a wireless portable (e.g., hand-held) computer network interaction device 108 having a tag reader 110 that is compatible with the format of machine readable tags 104. For example, tag reader 110 could be a bar code reader or an RFID scanner for machine-readable tags that that are of the barcode or RFID formats, respectively.

In addition, interaction device 108 includes a portable (e.g., hand-held) computing device 112, which in one implementation is a generally-programmable device such as a handheld computer (e.g., PocketPC™, Palm Pilot™, etc.), a tablet computer device, a wireless telephone, etc. Interaction device 108 is in wireless communication with a computer network (e.g., a wireless LAN, or WLAN) 114, which is in network communication with a public global computer network (e.g., the Internet) 116. The wireless communication may be according to any standard or technology, including GPRS, Bluetooth, WiFi, infrared, etc.

In one implementation, for example, interaction device 108 could include a tag reader 110, such as a Symbol SPS 3000 bar code scanner and wireless LAN (WLAN) network connector, available from Symbol Technologies, Inc. of Holtsville, N.Y. In this implementation, computing device 112 may be a handheld computer, such as an HP (Compaq) iPaq™ PocketPC™.

Figure 2:
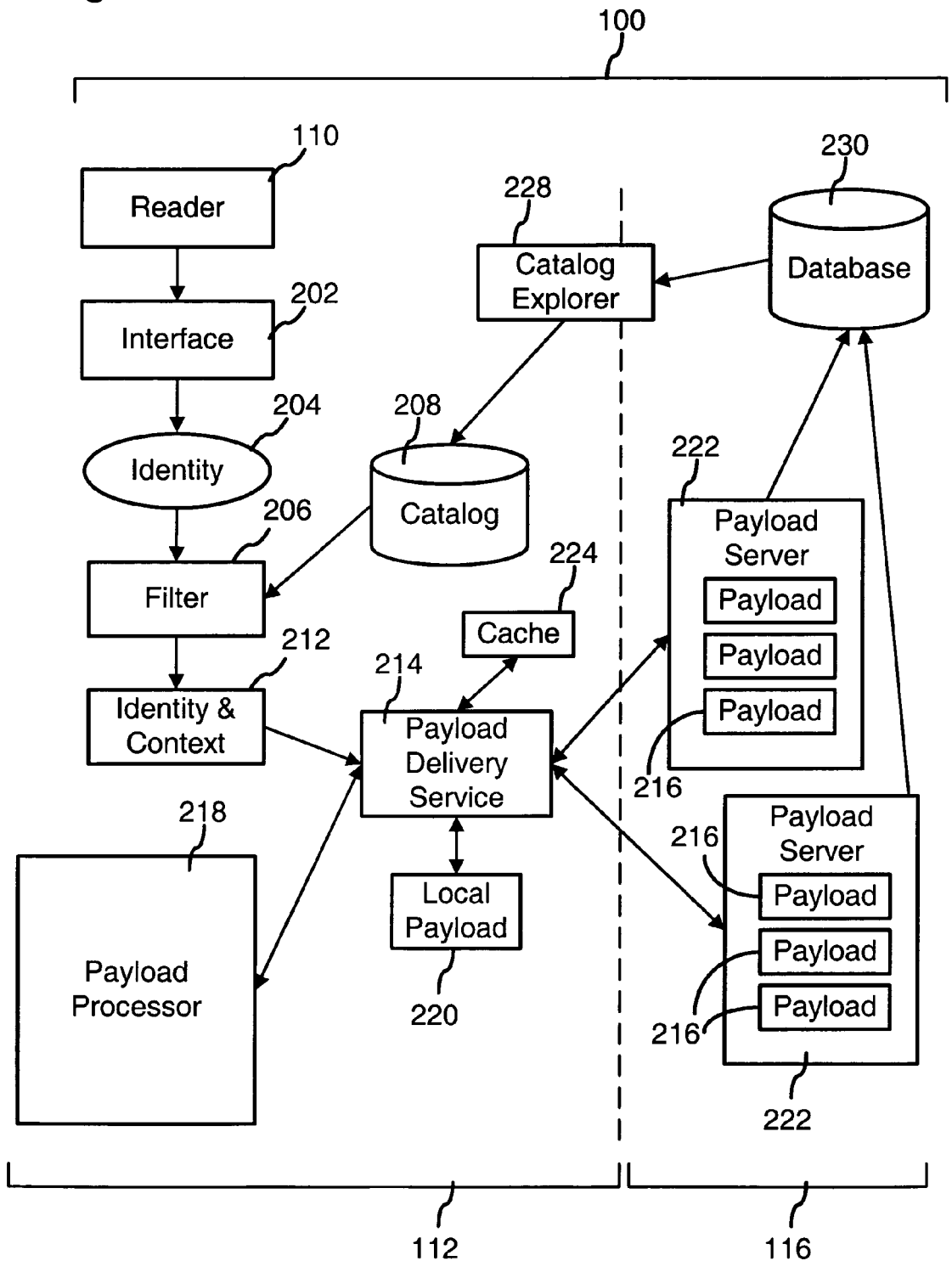
FIG. 2 is a block diagram illustrating functional software components of a wireless programmable user interaction system.

FIG. 2 is a block diagram illustrating functional software components of wireless programmable user interaction system 100, which are generally allocated between portable computing device 112 and computer network 116, for example. A tag reader interface component 202 is coupled to a tag reader 110, such as a RFID reader, a bar code reader, etc., and receives tag information from the tag reader. Interface component 202 provides tag identity information 204 that uniquely identifies the physical object 104 with which a scanned tag 102 is associated.

A filter component 206 functions to determine a category, class, or format (referred to collectively as categories) to which the identity information 204 corresponds. As one example, bar code tags 102 may correspond to any number of formats including the Universal Product Code (UPC) format, the International Standard Book Number (ISBN) format, and any other standardized or proprietary information format. In addition, the physical object represented by the bar code may correspond to a class of physical objects (e.g., books may be classified by genre, author, topic, etc.).

For example, each standard category of identity information 204 has a characteristic structure, which may include any or all of pre-defined prefix information, suffix information, or an arrangement of data. Filter component 206 operates in conjunction with a user interaction system catalog or database 208 that stores tag format information for identifying selected classes, categories, or formats for identity information 204. For example, filter component 206 may determine that message information 204 corresponds to "Type UPC code."

An identity and context component 212 manages a payload delivery service 214 to arrange for delivery of one or more functional payloads 216 to portable computing device 112 according to the identity and type of the identity information 204. Each payload 216 includes, for example, a browser-rendered or -executed page or function that is applicable to the identity and type of the identity information 204 and is compatible with the capabilities (e.g., display, computational, etc.) of portable computing device 112.

As one example, identity information 204 may identify an individual work of art in a gallery of works, each of which has a unique machine-readable tag 104. As a result, the identity information 204 for the art work would identify the information type as "Art Work," or even "Art Work of Gallery X," while also specifically identifying the work. Based upon the identity and type of the identity information 204, identity and context component 212 obtains from user interaction system catalog 208 an indication of one or more compatible payloads 216 that are available.

In addition to the tag format information, user interaction system catalog 208 stores identifiers or indications of one or more payloads 216 that are available for the type of the identity information 204, and also a computer network address indicating a location for each payload 216. Optionally, user interaction system catalog 208 may also store identifiers or indications of one or more payloads 216, and associated network addresses, that are available for specific identity information 204.

Each payload 216 may correspond to a user-selectable function or operation. In the present example, one payload 216 may display an explanation or interpretation of the work of art. Another payload 216 may display a biography of the artist. Another payload 216 may invite the user to enter or annotate his or her comments about the work to an electronic bulletin board or log of user comments.

Another payload 216 may launch for the user a search of a computer network (e.g., a local network 114, the Internet 116, or any other network) relating to the work or the artist. As a specific example of such a payload 216, a search could be directed to a specific network site offering for sale books, prints, etc. related to the artist of the work. As one example, the specific network site could be a third party network site for retail sales (e.g., www.Amazon.com or www.Barnesand-Noble.com) or could be an internal network site related to the gallery, such as a gallery gift shop.

Identity and context component 212 provides to payload delivery service 214 an indication of the one or more payloads 216 available for the identity and type of the identity information 204. Payload delivery service 214 provides on portable computing device 112 user-discernable (e.g., readable or audible) indications of the selectable functions or operations of the one or more payloads 216. The user-discernible indications may be provided in any format, for example as a menu, a listing, icons, or any other indications that are discernible by the user.

Payload delivery service 214 also functions to receive from the user an indication of which function or operation is selected, and retrieves the corresponding payload 216 for execution, rendering, etc. The payload 216 is executed by a payload processor 218, which may represent either direct processing by portable computing device 112 or processing by a browser operating on portable computing device 112 according to the format or language of payload 216. The payload 216 corresponding to the operation or function that is selected by the user may reside in a local memory 220 on the portable computing device 112, but more generally will be stored at one of one or more payload servers 222 that are remote from portable computing device 112, whether connected directly to the local computer network or in communication with it from another location on public global computer network (e.g., Internet) 116.

A cache 224 may function to store bufferable payloads 216, namely payloads that are operable without a live network connection. For example, cache 224 could allow payload processor 218 to operate without the concurrent presence of the wireless network connection. For a user moving between wireless access points or locations, for example, a bufferable payload 216 held in cache 224 could be updated once the user reached a wireless access point and re-established the wireless communication with network 114. In one implementation, wireless communication with network 114 is re-established automatically when the user moves into range of an access point.

While payloads 216 may be stored locally on portable computing device or on local payload servers 222, it will be appreciated that the availability of payloads 216 from generally remote and arbitrary payload servers 222 over public global computer network 116 can provide a user with a wide variety of selectable operations and functions. In addition to providing the user with access to information and services from third party (e.g., unaffiliated) network sites, such payloads 216 can also allow a user to interact with other individuals, post annotations for public viewing or for later private access by the user.

The above description illustrates operation of the present invention in relation to a single environment or context, namely an art gallery. While useable in such a single environment or context alone, it will be appreciated that wireless programmable user interaction system 100 may be used in a wide variety of contexts and environments, which can be illustrated by a pair of standard barcode formats, for example, the Universal Product Code (UPC) format and the International Standard Book Number (ISBN) format, in addition to an arbitrary proprietary barcode format for the exemplary art gallery (Art format).

These different bar code formats correspond to different classes or types of physical objects 102. As a result, different payloads 216 could be provided for each class or type of physical object 102 for which machine-readable tags 104 are being read. However, storage capacity limitations of portable computing device 112 prevent it from efficiently storing in system catalog 208 information for all payloads available for all classes, categories, or formats for identity information 204. For example, the products encompassed by the Universal Product Code could be divided into large numbers of product categories with very different payloads 216.

To accommodate such a range of classes, categories, or formats of identity information 204, wireless programmable user interaction system 100 includes a catalog explorer system 228 that provides a resolution service that resolves or conforms the list of payloads 216 in user interaction system catalog 208 with the class, category, or format of identity information 204 corresponding to one or more recently read tags. Catalog explorer system 228 obtains information to access relevant and available payloads 216 and updates catalog 208 accordingly. Catalog explorer system 228 may obtain payload information directly from payload servers 222 or from a database 230 of available payloads.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as my invention all such embodiments as may come within the scope and spirit of the following claims and equivalents thereto.

The invention claimed is:

1. A wireless programmable user interaction system providing user interaction with networked services relating to physical objects that have associated machine-readable tags, comprising:
   a portable interaction device in wireless communication with a computer network, the portable interaction device including a portable computing device, with a payload processor and an associated machine-readable tag reader, wherein the portable interaction device generates tag identity information relating to a selected physical object upon operating the machine-readable tag reader to read a machine-readable tag associated with the selected physical object;
   an interaction system catalog that can indicate types of information, interactions and computer network services that are available for the selected physical object, in the portable computing device of the portable interaction device, storing tag format information that correlates the tag identity information with an identity information category to obtain one or more functional payloads operable by the payload processor; and
   a payload delivery service that delivers to the payload processor a selected functional payload, received via the wireless communication, to be executed by the payload processor to provide to the user a networked service corresponding to the selected physical object; and
   a catalog explorer module that provides a resolution service that conforms a list of payloads in the interaction system catalog with a class, category or format of identity information corresponding to one or more recently read tags.

2. The system of claim 1 in which the computer network includes a public global computer network and the system further comprises a payload server that provides the selected functional payload via the public global computer network and the wireless communication.

3. The system of claim 1 further comprising a filter that identifies the identity information category of the tag identity information from among plural identity information categories stored in the interaction system catalog.

4. The system of claim 3 further wherein the catalog explorer module provides to the interaction system catalog via the wireless communication information to obtain one or more functional payloads that are operable by the payload processor and to provide networked services that are compatible with the identity information category of the tag identity information.

5. The system of claim 1 further comprising a component that retrieves from the interaction system catalog an indication of plural selectable network services that relate to the selected physical object, wherein the selected functional payload corresponds to one of the plural selectable network services.

6. The system of claim 5 in which the payload delivery service provides the user with indications of the plural selectable network services and in which the user selects the network service corresponding to the selected functional payload.

7. The system of claim 1 in which the machine-readable tags are bar code tags.

8. The system of claim 1 in which the networked service includes storing at a network location a user annotation relating to the selected physical object.

9. The system of claim 1 in which the portable computing device is generally programmable.

10. The system of claim 1 in which the payload processor includes a browser that executes the selected functional payload 11. The system of claim 1 in which the payload processor provides execution of the selected functional payload directly by the portable computing device.

12. In a portable interaction device with means for wireless communication with a computer network, the portable interaction device including a portable computing device and an associated machine-readable tag reader, wherein the portable interaction device generates tag identity information upon operating the machine-readable tag reader to read a machine-readable tag, user interaction software stored on the portable computing device and providing user interaction with networked services relating to selected physical objects that have associated machine-readable tags, comprising:
   a payload processor operating on the portable computing device comprising a tag reader;
   an interaction system catalog that can indicate types of information, interactions and computer network services that are available for the selected physical object, in the portable computing device of the portable interaction device, storing tag format information that correlates the tag identity information with an identity information category to obtain one or more functional payloads operable by the payload processor; and
   a payload delivery service that delivers to the payload processor a selected functional payload, received via the wireless communication, to be executed by the payload processor to provide to the user a networked service corresponding to the selected physical object; and
   a catalog explorer module that provides a resolution service that conforms a list of payloads in the interaction system catalog with a class, category or format of identity information corresponding to one or more recently read tags.

13. The device of claim 12 further comprising a filter that identifies the identity information category of the tag identity information from among plural identity information categories stored in the interaction system catalog.

14. The device of claim 13 further comprising a catalog explorer that provides to the interaction system catalog via the wireless communication information to obtain one or more functional payloads that are operable by the payload processor and to provide networked services that are compatible with the identity information category of the tag identity information.

15. The device of claim 12 further comprising a component that retrieves from the interaction system catalog an indication of plural selectable network services that relate to the selected physical object, wherein the selected functional payload corresponds to one of the plural selectable network services.

16. The device of claim 15 in which the payload delivery service provides the user with indications of the plural selectable network services and in which the user selects the network service corresponding to the selected functional payload.

17. The device of claim 12 in which the portable computing device is generally programmable.

18. The device of claim 12 in which the payload processor includes a browser that executes the selected functional payload.

19. A wireless programmable user interaction system providing user interaction with networked services relating to physical objects that have associated machine-readable tags, comprising:
   a portable interaction device in wireless communication with a local computer network, the portable interaction device including a portable computing device, with a payload processor, and an associated machine-readable tag reader, wherein the portable interaction device generates tag identity information relating to a selected physical object upon operating the machine-readable tag reader to read a machine-readable tag associated with the selected physical object;
   an interaction system catalog that can indicate types of information, interactions and computer network services that are available for the selected physical object, in the portable computing device of the portable interaction device, that stores tag format information that correlates the tag identity information with an identity information category and related information to obtain one or more functional payloads operable by the payload processor;
   a payload delivery service that delivers to the payload processor a selected functional payload, received via the wireless communication, to be executed by the payload processor to provide to the user a networked service corresponding to the selected physical object; and
   a payload server communicating with the local computer network via a public global computer network and providing the selected functional payload to the payload delivery service via the public global computer network and the wireless communication; and
   a catalog explorer module that provides a resolution service that conforms a list of payloads in the interaction system catalog with a class, category or format of identity information corresponding to one or more recently read tags.

20. The system of claim 19 further comprising a filter that identifies the identity information category of the tag identity information from among plural identity information categories stored in the interaction system catalog.

21. The system of claim 20 further comprising a catalog explorer that provides to the interaction system catalog via the wireless communication information to obtain one or more functional payloads that are operable by the payload processor and to provide networked services that are compatible with the identity information category of the tag identity information.

22. The system of claim 19 further comprising a component that retrieves from the interaction system catalog an indication of plural selectable network services that relate to the selected physical object, wherein the selected functional payload corresponds to one of the plural selectable network services.

23. The system of claim 22 in which the payload delivery service provides the user with indications of the plural selectable network services and in which the user selects the network service corresponding to the selected functional payload.

24. A wireless programmable user interaction system providing user interaction with networked services relating to physical objects that have associated machine-readable tags which provides information, interactions and computer services for a given physical object, comprising:
- a portable interaction device in wireless communication with a computer network, the portable interaction device including a portable computing device, with a payload processor and an associated machine-readable tag reader, wherein the portable interaction device generates tag identity information relating to a selected physical object upon operating the machine-readable tag reader to read a machine-readable tag associated with the selected physical object;
- an interaction system catalog that can indicate types of information, interactions and computer network services that are available for the selected physical object, in the portable computing device of the portable interaction device, storing tag format information that correlates the tag identity information with an identity information category to obtain one or more functional payloads operable by the payload processor; and
- a payload delivery service that delivers to the payload processor a selected functional payload, received via the wireless communication, to be executed by the payload processor that includes a browser that executes the selected functional payload at the portable interaction device to provide to the user a networked service corresponding to the selected physical object; and
- a catalog explorer module that provides a resolution service that conforms a list of payloads in the interaction system catalog with a class, category or format of identity information corresponding to one or more recently read tags.

* * * * *

UNITED STATES PATENT AND TRADEMARK OFFICE
CERTIFICATE OF CORRECTION

PATENT NO. : 7,519,682 B2  
APPLICATION NO. : 10/608240  
DATED : April 14, 2009  
INVENTOR(S) : Marc A. Smith et al.

It is certified that error appears in the above-identified patent and that said Letters Patent is hereby corrected as shown below:

In column 7, lines 12-13, in Claim 10, delete "payload" and insert -- payload. --, therefor.

Signed and Sealed this
Third Day of May, 2011

David J. Kappos
*Director of the United States Patent and Trademark Office*